United States Patent [19]
Rhoades

[11] Patent Number: 5,590,535
[45] Date of Patent: Jan. 7, 1997

[54] PROCESS AND APPARATUS FOR CONDITIONING CRYOGENIC FUEL TO ESTABLISH A SELECTED EQUILIBRIUM PRESSURE

[75] Inventor: George D. Rhoades, LaGrange, Ill.

[73] Assignee: Chicago Bridge & Iron Technical Services Company, Oak Brook, Ill.

[21] Appl. No.: 557,992

[22] Filed: Nov. 13, 1995

[51] Int. Cl.$^6$ .................................................. F17C 9/02
[52] U.S. Cl. ........................................ 62/50.2; 62/7
[58] Field of Search ............................. 62/50.2, 7, 657

[56] References Cited

U.S. PATENT DOCUMENTS

| | | | |
|---|---|---|---|
| 2,576,984 | 12/1951 | Wildhack | 62/1 |
| 2,732,103 | 1/1956 | Wright et al. | 222/330 |
| 2,945,354 | 7/1960 | Moskowitz | 62/51 |
| 3,195,316 | 7/1965 | Maher et al. | 62/52 |
| 3,271,965 | 9/1966 | Maher et al. | 62/23 |
| 3,507,302 | 4/1970 | Scott | 137/613 |
| 3,864,918 | 2/1975 | Lorenz | 60/651 |
| 3,885,394 | 5/1975 | Witt et al. | 60/651 |
| 3,990,256 | 11/1976 | May et al. | 62/53 |
| 4,276,749 | 7/1981 | Crowley | 62/51 |
| 4,292,062 | 9/1981 | Dinulescu et al. | 62/7 |
| 4,321,796 | 3/1982 | Kohno | 62/52 |
| 4,406,129 | 9/1983 | Mills | 62/7 |
| 4,475,348 | 10/1984 | Remes | 62/55 |
| 4,505,249 | 3/1985 | Young | 123/527 |
| 4,527,600 | 7/1985 | Fisher et al. | 141/4 |
| 4,531,558 | 7/1985 | Engel et al. | 141/44 |
| 4,680,937 | 7/1987 | Young | 62/54 |
| 4,738,115 | 4/1988 | Goode | 62/53 |
| 4,887,857 | 12/1989 | VanOmmeren | 141/1 |
| 4,966,206 | 10/1990 | Baumann et al. | 141/83 |
| 4,987,932 | 1/1991 | Pierson | 141/1 |

(List continued on next page.)

FOREIGN PATENT DOCUMENTS

| | | |
|---|---|---|
| 0219995 | 9/1988 | Japan . |
| 1130715 | 12/1984 | U.S.S.R. . |
| WO94/16986 | 8/1994 | WIPO . |

OTHER PUBLICATIONS

Ditmeyer, "Burlington Northern Railroad's Natural Gas Locomotive Project." Presented at Texas' 3rd Annual Alternative Vehicle Fuels Market Fair and Sumposium, Austin, Texas, Apr. 13, 1992.

Stolz, "Operating a Locomotive On Liquid Methane Fuel," *Pipeline and Gas Journal*, Apr. 1992, (pp. 45–49).

*Primary Examiner*—Ronald C. Capossela
*Attorney, Agent, or Firm*—Marshall, O'Toole, Gerstein, Murray & Borun

[57] ABSTRACT

A method and apparatus for conditioning cryogenic fuel includes providing a primary storage tank for liquefied cryogenic fuel, a vapor storage tank communicating with the primary storage tank for storing vapor withdrawn from the primary storage tank at a higher pressure than the pressure in the primary storage tank, and a conditioning system wherein heat is transferred to the colder, lower equilibrium pressure liquefied cryogenic fuel withdrawn from the primary storage tank. The conditioning system includes a heat exchanger system for transferring heat to the liquefied cryogenic fuel from vapor withdrawn from the vapor storage tank. The vapor is cooled to near saturation temperature in the heat exchanger and is then sparged into liquefied cryogenic fuel flowing through a sparger or mixer chamber disposed downstream of the heat exchanger. A temperature sensor disposed in a conduit downstream of the sparger or mixer chamber measures the temperature (and thus the equilibrium pressure) of the warmed cryogenic fuel in the conduit. A temperature controller in communication with the temperature sensor regulates the flow rate of vapor from the vapor storage tank to the cryogenic fuel conditioning system in response to a signal from the temperature sensor.

28 Claims, 2 Drawing Sheets

U.S. PATENT DOCUMENTS

| | | | |
|---|---|---|---|
| 5,029,622 | 7/1991 | Mutter | 141/4 |
| 5,081,977 | 1/1992 | Swenson | 123/527 |
| 5,107,906 | 4/1992 | Swenson et al. | 141/11 |
| 5,121,609 | 6/1992 | Cieslukowski | 62/50.4 |
| 5,127,230 | 7/1992 | Neeser et al. | 62/7 |
| 5,147,005 | 9/1992 | Haeggström | 180/69.5 |
| 5,163,409 | 11/1992 | Gustafson et al. | 123/525 |
| 5,211,021 | 5/1993 | Pierson | 62/50.2 |
| 5,228,295 | 7/1993 | Gustafson | 62/7 |
| 5,231,838 | 8/1993 | Cieslukowski | 62/50.4 |
| 5,243,821 | 9/1993 | Schuck et al. | 62/50.6 |
| 5,315,831 | 5/1994 | Goode et al. | 62/7 |
| 5,315,840 | 5/1994 | Viegas et al. | 62/50.2 |
| 5,325,894 | 7/1994 | Kooy et al. | 141/4 |
| 5,327,730 | 7/1994 | Myers et al. | 62/9 |
| 5,353,849 | 10/1994 | Sutton et al. | 141/44 |
| 5,360,139 | 11/1994 | Goode | 222/40 |
| 5,373,702 | 12/1994 | Kalet et al. | 62/50.2 |
| 5,467,603 | 11/1995 | Lehman et al. | 62/50.2 |
| 5,505,232 | 4/1996 | Barclay | 62/50.2 |

PROCESS AND APPARATUS FOR CONDITIONING CRYOGENIC FUEL TO ESTABLISH A SELECTED EQUILIBRIUM PRESSURE

BACKGROUND OF THE INVENTION

1. Field of the Invention

The invention relates to apparatus and methods for handling cryogenic fluids and in particular to apparatus and methods for conditioning liquefied natural gas for fueling motor vehicles.

2. Description of Related Technology

Cryogenic fuel tanks employed to contain highly volatile fuels, such as liquefied natural gas, typically store such fuels at low temperatures and pressures. Temperatures of about −252° F. to about −186° F. and pressures of about 5 psig to about 150 psig are typical. Low pressure storage is preferred, for example, because the trailers for delivery of liquefied natural gas also have a low design pressure in order to keep the weight of the trailers at a minimum. Also, customers typically prefer low pressure liquefied natural gas delivery to provide them with a maximum storage time before pressure rise in the storage tank requires venting.

Vehicle fuel systems, on the other hand, may require pressures in the range of at least 100 psig for satisfactory operation of the vehicle engine. Dispensing liquefied natural gas from a low pressure tank to a vehicle tank is therefore problematic. One problem is that if a low pressure liquid is pumped or otherwise transferred to a vehicle tank, and the pressure is raised inside the vehicle tank by adding vapor to the tank, vehicle motion can mix the cold liquid with the pressurizing vapor to condense away the pressure. Thus, the vehicle engine is supplied with fuel at a pressure insufficient for open throttle operation.

Gustafson, U.S. Pat. No. 5,228,295 and Kooy et al., U.S. Pat. No. 5,325,894 both teach the addition of vapor from a vapor space of a liquefied cryogenic fuel storage tank to a delivery conduit through which liquefied cryogenic fuel flows to a vehicle tank. The Gustafson patent, however, teaches flowing only a small amount of vapor from a storage tank to a delivery conduit in order to maintain pressure in the storage tank below a predetermined maximum pressure. There is no disclosure in the Gustafson patent of utilizing this small inflow of vapor to modify the equilibrium pressure of the liquefied cryogenic fuel. Furthermore, the apparatus disclosed in the Gustafson patent appears to lack the ability to fuel against a pressure much higher than the pressure of the fuel storage tank. A vehicle tank having a pressure of only a few pounds per square inch higher than the fuel storage tank would appear to cause the pump discharge to back flow to the top of the fuel storage tank rather than flow to the vehicle tank.

The Kooy et al. patent discloses flowing vapor from a liquefied cryogenic fuel storage tank, through a compressor, and directly into a liquefied cryogenic fuel delivery conduit. With reference to FIG. 3 of Kooy et al., a control valve disposed in the delivery conduit acts as a direct contact heat exchanger. A temperature controller disposed downstream of the valve regulates the control valve and thus the amount of liquefied cryogenic fuel flowing through the control valve relative to the amount of vapor supplied to the control valve. Problems with such a system may include the lack of control. A control valve alone cannot control the pump and compressor discharges because both the temperature and amount of flow of such discharges may vary. In the extreme case, neither the pump nor the compressor can run if its discharge flow must be stopped. Furthermore, in an apparatus according to the Kooy et al. patent, the response time of the mechanical equipment would most likely be too slow to keep up with the flow of a fueling operation. Also, the compressor discharge gas could quickly separate from the pump discharge liquid, greatly reducing heat transfer. Once the gas enters the vehicle fuel tank, the gas may only add head pressure and not change the liquid's equilibrium condition until the vehicle leaves the fueling station. Then the fuel tank pressure would drop as the colder liquid condenses the head space vapor and full throttle performance would not be possible.

Another problem that may occur in an apparatus disclosed in the Kooy et al. patent involves the size of compressor required for the conditioning operation. In such an apparatus, the compressor would need to be large enough to provide vapor at the maximum surge rate resulting in increased cost of oversizing from the normal flow requirements.

SUMMARY OF THE INVENTION

It is an object of the invention to overcome one or more of the problems described above.

A method of conditioning cryogenic fuel according to the invention includes the steps of withdrawing liquefied cryogenic fuel from a primary storage tank at a low pressure and at a temperature close to the boiling point of the liquefied cryogenic fuel and warming the liquefied cryogenic fuel by feeding the fuel through fuel warming apparatus. The method further includes the steps of withdrawing vapor from a vapor space in the primary storage tank and feeding the vapor to a vapor storage tank at a selected pressure higher than the pressure in the primary storage tank. The vapor from the vapor storage tank is then fed to the fuel warming apparatus wherein heat is transferred from the vapor to the liquefied cryogenic fuel by cooling (i.e., de-superheating) and condensing the vapor. The liquefied cryogenic fuel warmed by the vapor is then fed through a dispensing apparatus to a vehicle fuel tank. A temperature of the cryogenic fuel in the dispensing apparatus is measured. According to the inventive method, cryogenic fuel is provided to the vehicle fuel tank at a selected equilibrium pressure by varying a flow rate of the vapor withdrawn from the vapor storage tank and fed into the fuel warming apparatus in response to the temperature of the liquefied cryogenic fuel in the dispensing apparatus.

An apparatus according to the invention includes a primary storage tank for storing liquefied cryogenic fuel and a vapor storage tank in communication with a vapor space of the primary storage tank. The vapor storage tank stores the vapor at a selected pressure greater than a pressure in the primary storage tank. Also included in the inventive apparatus is equipment for warming liquefied cryogenic fuel from the primary storage tank by the transfer of heat from vapor from the vapor storage tank to the liquefied cryogenic fuel and subsequent transfer of heat of condensation of the vapor to the liquefied cryogenic fuel. An apparatus according to the invention further includes a device for dispensing warmed liquefied cryogenic fuel from the cryogenic fuel warming equipment connectable to a vehicle fuel tank. A temperature sensor is disposed in the dispensing device. A controller regulates a flow rate of vapor from the vapor storage tank to the cryogenic fuel warming equipment in response to a signal from the temperature sensor.

DETAILED DESCRIPTION OF THE INVENTION

According to the invention, a system is provided which matches an equilibrium condition of liquefied cryogenic fuel from a storage tank with the pressure requirement of a vehicle being fueled. As used herein, the term "cryogenic fuel" includes, for example, natural gas, methane, ethane, ethylene, and hydrogen. For simplicity, each instance of "natural gas" referred to herein should be understood to mean that other cryogenic liquids also may be used in the invention.

Figure 1:
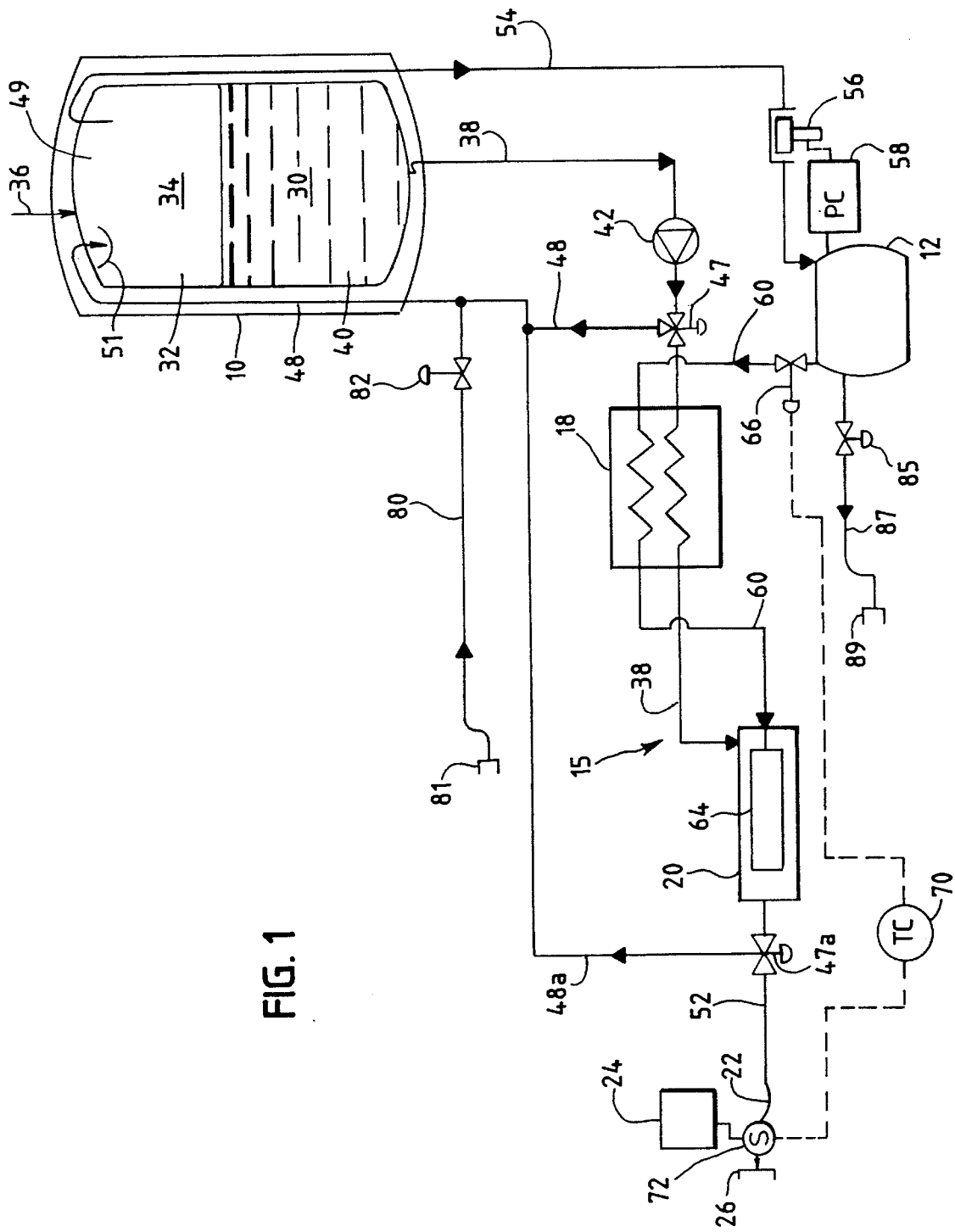
FIG. 1 is a schematic view of an apparatus according to the invention.

FIG. 1 illustrates an apparatus according to the invention having a primary tank 10, a vapor storage tank 12, and a liquefied natural gas conditioning system generally designated 15. The conditioning system 15 includes a heat exchanger 18, a sparger or mixer chamber 20, a delivery hose 22 equipped with an intrinsically safe monitoring and equilibrium set point device 24, and a vehicle tank coupling 26 for temporary and removable communication with an insulated vehicle fuel tank (not shown). The components of the system 15, and all pipes and hoses connecting the components of the system, are insulated.

The primary tank 10 is an insulated double-walled tank constructed of suitable materials so as to safely store a volume of liquefied natural gas 30 at a relatively low pressure. Preferably, the tank 10 stores the natural gas 30 between about 5 psig to about 150 psig, corresponding to a saturation temperature of about −252° F. to about −186° F. A vapor space 32 in an upper part of the primary tank 10 is provided to accumulate vapor 34 which forms as a result of heat flow from the atmosphere into the tank 10. A fill conduit 36 communicates with the interior of the tank 10 and provides a means for filling the tank 10 with liquefied natural gas. Although not shown in FIG. 1, the cryogenic tank preferably includes fill conduits communicating with both the top and bottom of the tank 10. This provides pressure control of the primary tank when the cryogen is delivered by the cryogen supplier. The top fill condenses vapor and the bottom fill builds pressure (false head).

A conduit 38 communicates with a lower interior space 40 of the tank 10, extends through the heat exchanger 18, and also communicates with the sparger or mixer chamber 20 disposed downstream of the heat exchanger 18 with respect to a direction of flow of liquefied natural gas through the conduit 38. A pump 42 is disposed in the conduit 38 between the tank 10 and the heat exchanger 18. The conduit 38 provides means for withdrawing a stream of liquefied natural gas 30 from the primary tank 10, feeding the liquefied natural gas through the heat exchanger 18 and to the sparger or mixer chamber 20.

During pump start-up and between fueling vehicles, liquefied natural gas from the storage tank 10 may be pumped through the conduit 38 via a valve 47 and into a conduit 48 which communicates with an upper interior portion 49 of the primary storage tank 10. Apparatus for breaking the liquid flowing into the tank 10 into small droplets, such as a spray device or a splash plate 51, is mounted in the tank 10. Recirculated liquid flowing out of the conduit 48 contacts the spray device or splash plate 51 which aids in condensing natural gas vapor.

A conduit 52 communicates with the sparger or mixer chamber 20 and the natural gas delivery hose 22. In addition to (or as an alternative to) the conduit 48, a conduit 48a communicates with both the conduit 52 and the tank 10 via a valve 47a disposed in the conduit 52. The valve 47a may either direct fluid through the conduit 52 and into the hose 22 or through the conduit 48a, circulating fluid from the conditioning system 15 back to the tank 10.

When the vehicle tank coupling 26 is connected to a vehicle to be fueled, the valves 47 and/or 47a are operated to stop the flow of fluid through the conduits 48 and/or 48a, respectively, and to direct liquefield natural gas through the conditioning system 15 and into the hose 22. Fluid flows through the conduit 38 which passes through the heat exchanger 18 and into the sparger or mixer chamber 20. Warmed liquefied natural gas from the sparger or mixer chamber 20 is fed through the conduit 52, the vehicle tank coupling 26, and into the vehicle to be fueled. The utilization of the valve 47a and conduit 48a communicating with the conduit 52 which is downstream of the conditioning system 15 reduces the amount of cool-down occurring during vehicle fueling start-up.

The liquefied natural gas exiting the sparger or mixer chamber 20 is at an equilibrium temperature (and thus an equilibrium pressure) selected to match equilibrium conditions in the vehicle tank being fueled. This is accomplished as follows:

A conduit 54 communicates with the upper interior portion 49 of the primary storage tank 10 and with the vapor storage tank 12. A compressor 56 is disposed in the conduit 54. The conduit 54 provides means for withdrawing the vapor 34 accumulating in the primary storage tank 10 through the compressor 56, thereby raising the pressure of the vapor (i.e., super-heating the vapor), and then flowing the vapor into the vapor storage tank 12. A pressure controller (pressure-stat) 58 communicates with the compressor 56 and the vapor storage tank 12 to start and stop the compressor 56 in order to provide a selected pressure of the vapor in the vapor storage tank 12. The pressure in the vapor storage tank preferably depends on the minimum pressure required for the vehicle being fueled. The pressure in the tank 12 is preferably high enough (or the tank 12 large enough) to provide for peak flows of fuel through the system without dropping much below the equilibrium pressure for the specific vehicle. The pressure in the vapor storage tank 12 may range between about 100 psig and about 250 psig, preferably, between about 100 psig and about 125 psig. Most preferably, the pressure in the vapor storage tank 12 is about 120 psig. A pressure-building vaporizer (not shown) is provided on the primary vessel 10 to assure that the pressure of the vapor 34 does not drop below the desired pressure for the compressor suction.

A conduit 60 communicates with the vapor storage tank 12, extends through the heat exchanger 18, and communicates with a sparger or mixer 64 disposed in the sparger or mixer chamber 20. A control valve 66 is disposed in the conduit 60.

In the indirect heat exchanger 18, vapor from the vapor storage tank 12 flows through the conduit 60 and transfers heat to the liquefied natural gas flowing through the conduit 38. The vapor in the conduit 60 is preferably cooled (i.e., de-superheated) to or near equilibrium temperature in the heat exchanger 18 and the liquefied natural gas is warmed, thus increasing the equilibrium temperature of the liquefied natural gas. A portion or all of the vapor from the storage tank 12 may be condensed in the heat exchanger 18. Control of the amount of condensation in the exchanger and control of the sizing of the exchanger are not critical. The exchanger 18 is made from materials suitable for the temperatures and pressures encountered in cryogenic fueling systems and is preferably of stainless steel design. Regardless of whether vapor or liquid from the conduit 60 is mixed with the liquid from the conduit 38 in the chamber 20, heat of both cooling and condensation of the vapor from the tank 12 is blended into fluid flowing from the conduit 38 by the time the fluid stream flows through the conduit 52. What is important is that in the heat exchanger 18, the "super-heat" is removed from the vapor so that any remaining vapor sparged or otherwise mixed with the fluid from the conduit 60 will condense upon contact with the liquid and not separate from the colder liquid stream from the conduit 38.

The de-superheated vapor and/or condensed liquefied natural gas from the heat exchanger 18 is then fed from the conduit 60 into the sparger or mixer 64 where the vapor is sparged (i.e., blended) into the liquefied natural gas flowing from the conduit 38 and through the sparger or mixer chamber 20. A variety of mixing device designs may be utilized which are suitable for the temperatures and pressures which may be encountered in cryogenic systems. A preferred mixing system according to the invention is a sparger and sparger chamber of stainless steel design.

The sparging, spraying, or other blending of the vapor and any liquid from the conduit 60 exiting the heat exchanger 18 into the liquefied natural gas in the chamber 20 results in the condensation of the remaining vapor and the transfer of heat of de-superheating and condensing of the vapor to the liquefied natural gas. Thus, a warmed liquefied natural gas stream, for example, ranging between about −220° F. to about −160° F., corresponding to an equilibrium pressure of about 50 psig to about 280 psig, flows into the conduit 52 and through the delivery hose 22.

A temperature controller 70 is in communication with the control valve 66 disposed in the conduit 60 and with a temperature sensor 72 disposed in the delivery hose 22. The temperature controller 70 regulates the control valve 66 and thus the amount of vapor from the vapor storage tank 12 supplied to the heat exchanger 18 and the sparger or mixer 64. The temperature sensor 72 measures the equilibrium temperature of the liquefied natural gas in the hose 22 which is indicative of the equilibrium pressure thereof. Thus a readout or face plate of the monitoring and equilibrium set point device 24 which communicates with the sensor 72 preferably indicates a pressure reading (e.g., pounds of equilibrium) rather than degrees of temperature as the operator fueling the vehicle will be interested in the equilibrium pressure.

Based upon the temperature measured by the temperature sensor 72, the amount of vapor flowing through the conduit 60 may be automatically adjusted by the temperature controller 70 and cooperating valve 66 to either increase or decrease the temperature of the liquefied natural gas flowing through the hose 22 in order to match the equilibrium pressure conditions within a vehicle fuel tank. In FIG. 1, the temperature controller 70 is shown disposed at a distance from the hose 22. Preferably, the temperature controller 70 is disposed at least about fifteen feet from liquid flow conduits in order to avoid having to make the controller 70 explosion-proof. The motor and motor controls of the compressor 56 also are preferably at least about fifteen feet from the liquid and vapor flow conduits.

The control valve 66 may be operated by the automatic temperature controller 70 or may be operated manually. When manual operation is desired, an operator reads the equilibrium temperature (which is indicated as pressure on the monitor 24) measured by the temperature sensor 72. In addition to an equilibrium pressure indication, the monitor 24 preferably includes a manual override of the automatic temperature controller 70. Therefore, in response to the reading from the monitor, an operator can control the flow of vapor through the conduit 60, and thus the equilibrium temperature and pressure conditions of the liquefied natural gas flowing through the hose 22.

When the vehicle tank coupling 26 is connected to a vehicle (not shown), warm liquefied natural gas from the hose 22 flows through the coupling and into the vehicle tank. The temperature of the liquefied natural gas flowing in the hose 22 is regulated so that the temperature and pressure in the hose 22 equates with the desired vehicle fuel tank temperature and pressure. The warmed liquefied natural gas is fed from the hose 22 into the insulated fuel tank until the tank is essentially filled. The valve 66 is then closed and the valve 47 or 47a diverts discharge from the pump 42 back to the storage tank 10. The coupling 26 is removed from the vehicle fuel tank and the tank and hose 22 check valves (not shown) automatically close to prevent the loss of liquefied natural gas.

Advantages of apparatus and methods according to the invention include, but are not limited to providing a system wherein the measuring and control components are small and are disposed inside the liquid transfer conduit, allowing the conditioning system to be ready for substantially instant response; a system wherein all components are within the realm of what an operator can understand and analyze; a system which can be operated in either an automatic or manual mode; a system wherein an operator can change the amount of conditioning delivered to liquefied cryogenic fuel from a storage tank to match the amount of conditioning required for each individual vehicle; and a system wherein an operator can view liquefied natural gas condition on an intrinsically safe temperature indicator at the transfer hose connection to the vehicle being fueled. In methods and apparatus according to the invention, the conditioning of cryogenic fuel can be accomplished completely independent of the tempurature and pressure of liquid in the primary cryogenic fuel storage vessel; the vehicle tank temperature and pressure; and the ambient air temperature.

Furthermore, according to the invention, an adequate, reliable supply of vapor at a selected pressure is provided by drawing vapor from the primary cryogenic fuel storage tank via a compressor and storing the vapor in a separate vapor storage tank. This vapor is (1) cooled (i.e., de-superheated) and possibly partially condensed in indirect heat exchange with liquefied cryogenic fuel from a primary heat storage tank and then (2) fully condensed and intimately combined with the liquefied cryogenic fuel. By this two-step heat exchange process according to the invention, the possibility of vapor entrainment in the delivery hose (and subsequent pressure drop in the vehicle tank if the vapor condenses therein) is minimized. Furthermore, by providing a high pressure vapor storage tank, the apparatus according to the invention can provide an adequate supply of vapor for warming liquefied natural gas even under surge conditions. Because the amount of vapor flow is not controlled by the size of compressor, an oversized compressor is not required to keep up with the flow of a fueling operation.

Furthermore, an apparatus according to the invention shown in FIG. 1 includes a conduit 80 having a vehicle coupling 81 at an end thereof and a valve 82 disposed therein which controls a flow of natural gas from a vehicle fuel tank to the primary storage tank 10 in the event the vehicle tank being fueled requires a two (2) line filling procedure.

Also in an apparatus according to the invention shown in FIG. 1, pressurized vapor from the high pressure storage tank 12 can be discharged directly into a vehicle tank vapor space by opening a valve 85 disposed in a conduit 87 which communicates with the tank 12 and an adaptor 89 for connecting to the vehicle tank vapor space. The flow of high pressure vapor from the tank 12 into the vehicle tank vapor space removes liquefied natural gas from the vehicle tank (i.e., defuels the vehicle tank). The liquefied natural gas from the vehicle tank may be fed through the conduit 80 and into the primary storage tank 10, or vented through a vent stack (not shown) of a fueling station to which the apparatus of FIG. 1 is a part.

Thus, in apparatus and methods according to the invention, there is no requirement for a source of nitrogen gas, which is typically utilized to defuel a vehicle tank. Systems using nitrogen gas to defuel typically blow some of the nitrogen gas into the primary storage tank along with the last of the liquefied natural gas from the vehicle tank. Also, when a defueled vehicle tank is returned to service, some of the nitrogen in the vehicle tank is also vented into the vapor space 32 of the storage vessel 10. The nitrogen gas then interferes with the ability of cold liquefied natural gas to condense the pressure in the storage tank for an extended time after the defueling and/or refueling process. In contrast, when natural gas vapor is used instead of nitrogen, the high pressure natural gas vapor blown into the storage tank with the last of the liquefied natural gas from defueling or refueling the vehicle provides no such interference. High pressure natural gas returned to the vapor space of the primary storage tank 10 is simply condensed by the cold liquid delivered from the liquid supplier or removed from the tank and compressed into conditioning vapor in the conduit 54 to be stored in the vapor storage tank 12. Thus, a "no vent" fueling station is provided by apparatus according to the invention.

EXAMPLE

A vehicle (not shown), stores liquefied natural gas on-board in an insulated vehicle tank. Fuel is removed from the vehicle tank, vaporized to gaseous state, and fed to a fuel injected internal combustion engine. Proper operation of the vehicle engine requires a pressure of about 100 psig in the vehicle tank.

Figure 2:
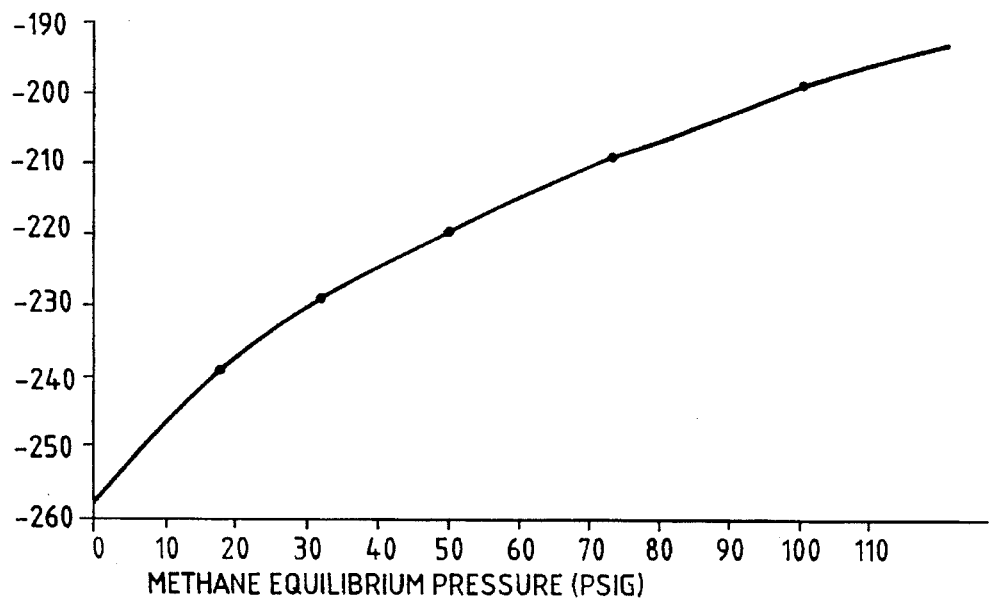
FIG. 2 is graph depicting methane equilibrium temperature (° F.) vs. methane equilibrium pressure (psig).

The equilibrium pressure of liquefied natural gas changes over a relatively wide temperature range. Thus, temperature can be used as a measure of equilibrium pressure. Known data for liquefied methane may be used to represent the relationship between liquefied natural gas equilibrium temperature verses equilibrium pressure. This relationship is shown by the curve in FIG. 2. Thus, from FIG. 2, a pressure of 100 psig in the vehicle tank corresponds to a saturation temperature of about −200° F.

At the fueling station, liquefied natural gas is stored in the primary storage tank 10 at about 30 psig (corresponding to a saturation temperature of about −230° F.). If the vehicle is filled with −230° F. liquid directly from the storage tank 10, the pressure in the vehicle tank will drop significantly below 100 psig and the vehicle engine will not receive an adequate fuel supply for open throttle operation. Therefore, an apparatus according to the invention is utilized wherein vapor 34 from the vapor space 32 of the primary storage tank 10 is compressed and stored in the vapor storage tank 12 at about 120 psig. This vapor is then cooled (i.e., de-superheated) and condensed through the heat exchanger 18 and sparger 64, wherein heat from the vapor is transferred to liquefied natural gas being withdrawn from the primary storage tank 10 through the conduit 38.

The temperature of the warmed liquefied natural gas exiting the sparger or mixer chamber through the conduit 52 and flowing through the delivery hose 22 is measured by the temperature sensor 72 disposed in the hose 22. The sensor 72 communicates the temperature signal to the temperature controller 70 and to the monitor 24.

It is known that the heat released when liquefied natural gas is condensed is about 200 BTU/lb. It is further known that the heat released in cooling liquefied natural gas vapor to saturation temperature from ambient temperature (60° F.) is about 150 BTU/lb. Thus:

$$\frac{\text{BTU Available}}{\text{lb. vapor cooled and condensed}} = \frac{200 \text{ BTU}}{\text{lb. latent}} + \frac{150 \text{ BTU}}{\text{lb. sensible}}$$

Figure 3:
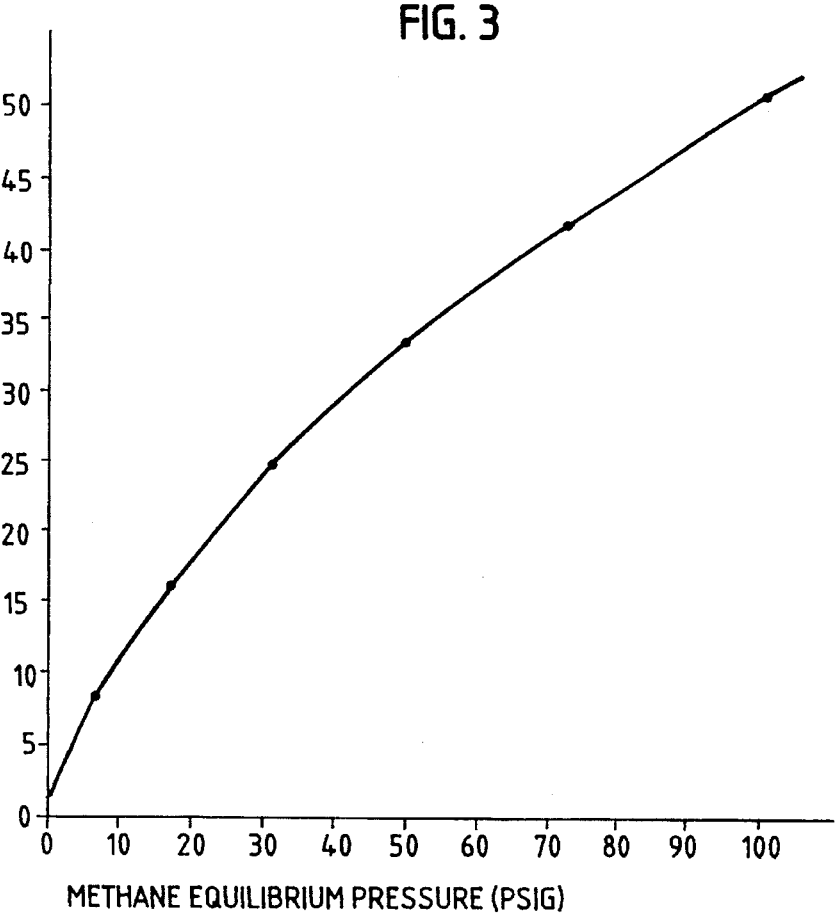
FIG. 3 is a graph depicting change in liquefied methane heat content (BTU/pound methane) vs. methane equilibrium pressure (psig).

The curve shown in FIG. 3 illustrates the change in methane heat content with the corresponding change in equilibrium pressure. From this curve, the change in heat content of increasing methane from 30 psig to 100 psig equilibrium is about 26 BTU/lb.

Comparing the BTU available from cooling (i.e., de-superheating) and condensing vapor (i.e., 350 BTU/lb.) to the heat required to warm liquefied methane (i.e., 26 BTU/lb), the following is observed:

$$\frac{26 \text{ BTU/lb. warmed}}{350 \text{ BTU/lb. de-superheated \& condensed}} = \frac{0.074 \text{ lbs. vapor needed}}{\text{lb. liquid warmed}}$$

Thus, fueling at a typical rate of 30 gal. methane/min. would require about 8 lbs. vapor/min. as illustrated by the following equation:

$$\frac{30 \text{ gal.}}{\text{min.}} \times \frac{3.6 \text{ lb. liquid}}{\text{gal.}} \times \frac{0.074 \text{ lb. vapor}}{\text{lb. liquid}} = \frac{8 \text{ lb. vapor}}{\text{min.}}$$

Since methane vapor has a specific volume of about 1.27 ft³/lb. at 100 psig, the rate of 100 psig vapor required to warm 30 gal./min. liquefied natural gas to 100 psig equilibrium would be about 10.16 ft³/min., as illustrated by the following equation:

$$\frac{8 \text{ lb. vapor}}{\text{min.}} \times \frac{1.27 \text{ ft}^3}{\text{lb. vapor}} = \frac{10.16 \text{ ft}^3 \text{ of } 100 \text{ psig vapor}}{\text{min.}}$$

Thus, in order to match the equilibrium condition of the liquified natural gas with the pressure requirement of the vehicle being fueled (i.e., to provide liquefied natural gas to the coupling 26 at a temperature of about −200° F. corresponding to an equilibrium pressure of about 100 psig), the temperature controller 70 (or an operator) causes the valve 66 to open to an extent necessary to feed 10.16 ft³ of 100 psig vapor/min. through the conduit 60.

The vehicle tank is thus filled with liquefied natural gas at an equilibrium pressure of about 100 psig, allowing the vehicle engine to be operated with full throttle response.

The foregoing detailed description is given for clearness of understanding only, and no unnecessary limitations should be understood therefrom, as modifications within the scope of the invention will be apparent to those skilled in the art.

I claim:

1. A method of conditioning cryogenic fuel comprising the steps of:
   (a) withdrawing liquefied cryogenic fuel from a primary storage tank at a low pressure and at a temperature close to the boiling point of the liquefied cryogenic fuel;
   (b) warming the liquefied cryogenic fuel by feeding the fuel through means for warming the fuel;
   (c) withdrawing vapor from a vapor space in the primary storage tank and feeding the vapor to a vapor storage tank at a selected pressure higher than the pressure in the primary storage tank;
   (d) feeding the vapor from the vapor storage tank to the means for warming the liquefied cryogenic fuel wherein heat is indirectly transferred from the vapor to the liquefied cryogenic fuel and the vapor is subsequently condensed;
   (e) subsequently feeding the liquefied cryogenic fuel through means for dispensing the liquefied cryogenic fuel into a vehicle fuel tank;
   (f) measuring a temperature of the cryogenic fuel in the dispensing means; and
   (g) providing the cryogenic fuel to the vehicle fuel tank at a selected equilibrium pressure by varying a flow rate of the vapor withdrawn from the vapor storage tank and fed into the means for warming the liquefied cryogenic fuel in response to the temperature of the liquefied cryogenic fuel in the dispensing means.

2. The method of claim 1 wherein the vapor withdrawn from the primary storage tank is fed through a compressor to increase the pressure thereof prior to being fed into the vapor storage tank.

3. The method of claim 1 wherein the step of warming the liquefied cryogenic fuel further comprises the steps of:
   (a) feeding the liquefied cryogenic fuel through a heat exchanger wherein the vapor from the vapor storage tank is also fed through the heat exchanger and is cooled to near a saturation temperature thereof; and
   (b) combining the vapor exiting the heat exchanger with the liquefied cryogenic fuel exiting the heat exchanger.

4. The method of claim 3 wherein the vapor exiting the heat exchanger is blended into the liquefied cryogenic fuel exiting the heat exchanger.

5. The method of claim 1 wherein the step of measuring the temperature of the liquefied cryogenic fuel is performed with a temperature sensor which communicates a signal indicative of equilibrium temperature and pressure to a controller and including the step of determining with the controller, in response to the signal from the temperature sensor, a flow rate of the vapor into the means for warming the liquefied cryogenic fuel.

6. The method of claim 5 further comprising providing a monitor communicating with the temperature sensor, said monitor comprising a temperature indicator and a manual override of the controller.

7. The method of claim 6 wherein said temperature indicator comprises a readout for an equivalent equilibrium pressure.

8. The method of claim 1 further comprising the step of reducing an internal pressure of a vehicle fuel tank by allowing fuel to flow from the vehicle fuel tank to the primary insulated storage tank.

9. The method of claim 1 further comprising the step of removing liquefied cryogenic fuel from a vehicle fuel tank by flowing vapor directly from the vapor storage tank directly into the vehicle fuel tank.

10. A method of conditioning cryogenic fuel comprising the steps of:
    (a) withdrawing liquefied cryogenic fuel from a primary storage tank at a low pressure and at a temperature close to the boiling point of the liquefied cryogenic fuel;
    (b) feeding the liquefied cryogenic fuel through an indirect heat exchanger;
    (c) feeding the liquefied cryogenic fuel to a sparger or mixer chamber;
    (d) withdrawing vapor from a vapor space in the primary storage tank and compressing the vapor;
    (e) feeding the compressed vapor to a vapor storage tank and storing the vapor therein at a selected pressure;
    (f) feeding the vapor from the vapor storage tank through the indirect heat exchanger wherein the vapor is cooled to near a saturation temperature thereof, and alternatively at least partially condensed, the heat from the cooling and condensing of the vapor warming the liquefied cryogenic fuel being fed through the heat exchanger;
    (g) sparging the vapor and any condensate exiting the heat exchanger into the liquefied cryogenic fuel in the sparger or mixer chamber, said sparging step condensing the remaining vapor from the heat exchanger;
    (h) feeding the warmed liquefied cryogenic fuel from the sparger or mixer chamber into a vehicle fuel tank;
    (i) measuring the temperature of the liquefied cryogenic fuel exiting the sparger or mixer chamber; and
    (j) providing liquefied cryogenic fuel at a selected equilibrium pressure to the vehicle fuel tank by varying a flow rate of the vapor exiting the vapor storage tank in response to the temperature of the liquefied cryogenic fuel exiting the sparger chamber.

11. The method of claim 10 wherein the step of measuring the temperature of the liquefied cryogenic fuel is performed with a temperature sensor which communicates a signal indicative of equilibrium temperature and pressure to a controller and including the step of determining with the controller, in response to the signal from the temperature sensor, a flow rate of the vapor into the heat exchanger.

12. The method of claim 11 further comprising providing a monitor communicating with the temperature sensor, said monitor comprising an equilibrium pressure readout corresponding to a temperature value detected by the temperature sensor and a manual override of the controller.

13. The method of claim 10 further comprising the step of reducing an internal pressure of a vehicle fuel tank by allowing fuel to flow from the vehicle fuel tank to the primary insulated storage tank.

14. The method of claim 10 further comprising the step of removing liquefied cryogenic fuel from a vehicle fuel tank by flowing vapor directly from the vapor storage tank directly into the vehicle fuel tank.

15. A fuel delivery apparatus comprising:
    (a) a primary storage tank for storing liquefied cryogenic fuel, said tank having a vapor space;
    (b) a vapor storage tank in communication with the vapor space of the primary storage tank, said vapor storage tank for storing vapor from the primary storage tank at a selected pressure greater than a pressure in the primary storage tank;

(c) means for warming liquefied cryogenic fuel from the primary storage tank by indirect transfer of heat from vapor from the vapor storage tank to the liquefied cryogenic fuel and subsequent transfer of heat of condensation of the vapor to the liquefied cryogenic fuel, said cryogenic fuel warming means in communication with both the primary storage tank and the vapor storage tank;

(d) means for dispensing warmed liquefied cryogenic fuel from the cryogenic fuel warming means, said dispensing means in communication with said warming means and connectable to a vehicle fuel tank;

(e) a temperature sensor disposed in the dispensing means; and (f) means for controlling a flow rate of vapor from the vapor storage tank to the cryogenic fuel warming means in response to a signal from the temperature sensor, said control means in communication with the vapor storage tank.

16. The apparatus of claim 15 wherein the warming means comprises:

(a) a heat exchanger in communication with both the primary storage tank and the vapor storage tank and disposed directly downstream therefrom with respect to directions of flow of liquefied cryogenic fuel and vapor, respectively, through the heat exchanger, said heat exchanger for warming the liquefied cryogenic fuel and cooling the vapor to near a saturation temperature thereof; and (b) means for combining the liquefied cryogenic fuel exiting the heat exchanger and the vapor exiting the heat exchanger.

17. The apparatus of claim 16 wherein the means for combining the liquefied cryogenic fuel and the vapor is a sparger or mixer chamber.

18. The apparatus of claim 15 wherein the means for dispensing warmed liquefied cryogenic fluid is an insulated hose having a vehicle tank coupling.

19. The apparatus of claim 15 wherein the means for controlling the flow rate of vapor from the vapor storage tank comprises:

(a) a conduit communicating with the vapor storage tank and the heat exchanger;

(b) a valve disposed in the conduit; and (c) a controller in communication with the valve and the temperature sensor, said sensor communicating a signal indicative of equilibrium temperature and pressure to the controller.

20. The apparatus of claim 19 further comprising a monitor communicating with the temperature sensor, said monitor comprising an equilibrium pressure readout corresponding to a temperature value detected by the temperature sensor and a manual override of the controller.

21. The apparatus of claim 15 further comprising a conduit communicating with the dispensing means, the conduit receiving fluid from a vehicle fuel tank and feeding fluid to the primary tank to reduce internal pressure of the vehicle fuel tank.

22. The apparatus of claim 15 further comprising a conduit communicating with the vapor storage tank and the fuel dispensing means, the conduit for receiving pressurized vapor from the vapor storage tank and feeding the vapor to the vehicle fuel tank.

23. A fuel delivery apparatus comprising:

(a) a primary storage tank for storing liquefied cryogenic fuel, said tank having a vapor space;

(b) a first conduit having a compressor disposed therein and communicating with the vapor space of the primary storage tank;

(c) a vapor storage tank communicating with the first conduit, said vapor storage tank for storing vapor from the primary storage tank at a selected pressure greater than a pressure in the primary storage tank;

(d) a second conduit in communication with the vapor storage tank having a valve disposed therein;

(e) a third conduit in communication with liquefied cryogenic fuel disposed in the primary storage tank;

(f) a heat exchanger for transferring heat from vapor fed through said second conduit to liquefied cryogenic fuel being fed through said third conduit;

(g) a sparger or mixer chamber in communication with both said second conduit and said third conduit;

(h) a fourth conduit communicating with a downstream portion of the sparger or mixer chamber with respect to a direction of flow of fluid through the sparger or mixer chamber;

(i) a temperature sensor disposed in the fourth conduit; and (j) means for controlling a flow rate of vapor through the second conduit in response to a signal from the temperature sensor, said control means in communication with the valve in the second conduit.

24. The apparatus of claim 23 wherein the fourth conduit comprises an insulated hose having a vehicle tank coupling.

25. The apparatus of claim 23 further comprising a monitor communicating with the temperature sensor, said monitor comprising an equilibrium pressure readout corresponding to a temperature value detected by the temperature sensor and a manual override of the controller.

26. The apparatus of claim 23 further comprising a fifth conduit connected to the third conduit for withdrawing liquefied cryogenic fuel from the primary storage tank and returning the cryogenic fuel to the primary storage tank.

27. The apparatus of claim 23 further comprising a fifth conduit communicating with the fourth conduit and having means for communicating with a vehicle fuel tank, the fifth conduit for receiving fluid from a vehicle fuel tank and feeding fluid to the primary tank to reduce internal pressure of the vehicle fuel tank.

28. The apparatus of claim 24 further comprising a fifth conduit in communication with the vapor storage tank and the vehicle tank coupling, the fifth conduit for receiving pressurized vapor from the vapor storage tank and feeding the pressurized vapor to the vehicle fuel tank.

* * * * *